US012505847B2

(12) United States Patent
Ragot

(10) Patent No.: US 12,505,847 B2
(45) Date of Patent: Dec. 23, 2025

(54) OPTIMIZED ENCODING OF ROTATION MATRICES FOR ENCODING A MULTICHANNEL AUDIO SIGNAL

(71) Applicant: ORANGE, Issy-les-Moulineaux (FR)

(72) Inventor: Stéphane Ragot, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 301 days.

(21) Appl. No.: 18/258,677

(22) PCT Filed: Dec. 9, 2021

(86) PCT No.: PCT/FR2021/052257
§ 371 (c)(1),
(2) Date: Jun. 21, 2023

(87) PCT Pub. No.: WO2022/136760
PCT Pub. Date: Jun. 30, 2022

(65) Prior Publication Data

US 2024/0137041 A1 Apr. 25, 2024

(30) Foreign Application Priority Data

Dec. 22, 2020 (FR) ...................................... 2013954

(51) Int. Cl.
*G10L 19/008* (2013.01)
*G10L 19/032* (2013.01)

(52) U.S. Cl.
CPC .......... *G10L 19/008* (2013.01); *G10L 19/032* (2013.01)

(58) Field of Classification Search
CPC ............................ G10L 19/008; G10L 19/032
See application file for complete search history.

(56) References Cited

U.S. PATENT DOCUMENTS

2004/0101048 A1* 5/2004 Paris ..................... G10L 19/008 704/E19.023
2008/0298672 A1* 12/2008 Wallack .................... G06T 7/73 382/154

(Continued)

FOREIGN PATENT DOCUMENTS

EP 3706119 A1 9/2020
WO 2020/177981 A1 9/2020

OTHER PUBLICATIONS

International Search Report dated Apr. 20, 2022 for corresponding International Application No. PCT/FR2021/052257, filed Dec. 9, 2021.

(Continued)

*Primary Examiner* — Shaun Roberts
(74) *Attorney, Agent, or Firm* — David D. Brush; Westman, Champlin & Koehler, P.A.

(57) ABSTRACT

A method for encoding a multichannel sound signal, a corresponding decoding method, an encoding device and a decoding device. The encoding method includes: forming a transformation matrix in the form of a rotation matrix to be applied to the input signals; quantifying the rotation matrix; and encoding the transformed signals after application of the rotation matrix. The quantifying of the rotation matrix includes the following operations: converting the rotation matrix in the quaternion domain with at least one first quaternion; forcing the first quaternion to have a positive component; converting the at least one first quaternion into spherical coordinates, one of the spherical coordinates being associated with the forced positive component of the first quaternion; and quantifying the resulting rotating spherical coordinates, the spherical coordinate associated with the forced positive component of the first quaternion being quantified in a half-length interval.

13 Claims, 8 Drawing Sheets

(56) References Cited

U.S. PATENT DOCUMENTS

| | | | | |
|---|---|---|---|---|
| 2009/0083045 | A1* | 3/2009 | Briand | G10L 19/008 704/500 |
| 2014/0321710 | A1* | 10/2014 | Robert | A61B 34/20 382/103 |
| 2014/0355766 | A1* | 12/2014 | Morrell | H04S 7/304 381/18 |
| 2014/0358557 | A1* | 12/2014 | Sen | G10L 19/02 704/500 |
| 2015/0332682 | A1* | 11/2015 | Kim | G10L 19/008 381/23 |
| 2017/0366914 | A1* | 12/2017 | Stein | H04S 3/008 |
| 2017/0372748 | A1* | 12/2017 | McCauley | H04N 21/439 |
| 2022/0148607 | A1 | 5/2022 | Ragot et al. | |
| 2022/0279299 | A1* | 9/2022 | Vasilache | G10L 19/008 |
| 2022/0335956 | A1* | 10/2022 | Vasilache | G10L 19/008 |
| 2024/0013793 | A1* | 1/2024 | Bruhn | G10L 19/008 |

OTHER PUBLICATIONS

Written Opinion of the International Searching Authority dated Apr. 20, 2022 for corresponding International Application No. PCT/FR2021/052257, filed Dec. 9, 2021.

Hoffman, D. K. et al., "Generalization of Euler angles to N-Dimensional Orthogonal Matrices" published in the Journal of Mathematical Physics 13, 528(1972), doi: 10.1063/1.1666011.

Mahé Pierre et al., "First-Order Ambisonic Coding with PCA Matrixing and Quaternion-Based Interpolation", Proceedings of the 22nd International Conference on Digital Audio Effects (DAFx-19), Sep. 2, 2019 (Sep. 2, 2019), p. 1-8, Retrieved from the Internet: URL:https://www.dafx.de/paper-archive/2019/DAFx2019_paper_15.pdf, XP055835009.

Mahé Pierre et al., "First-order ambisonic coding with quaternion-based interpolation of PCA rotation matrices", Paris, France, DOI: 10.25836/sasp.2019.19 external link, Aug. 30, 2019 (Aug. 30, 2019), p. 7-12, Retrieved from the Internet: URL:https://hal.archives-ouvertes.fr/hal-02275181/document, XP055835006.

Perotin et al., "CRNN-based multiple DoA estimation using acoustic intensity features for Ambisonics recordings", IEEE Journal of Selected Topics in Signal Processing, vol. 13, No. 1, Mar. 2019.

J. P. Adoul, "Lattice and Trellis Coded Quantizations for efficient Coding of Speech", In: Ayuso, Soler (eds), Speech Recognition and Coding, NATO ASI Series, 1995.

English translation of the Written Opinion of the International Searching Authority dated Apr. 20, 2022 for corresponding International Application No. PCT/FR2021/052257, filed Dec. 9, 2021.

* cited by examiner

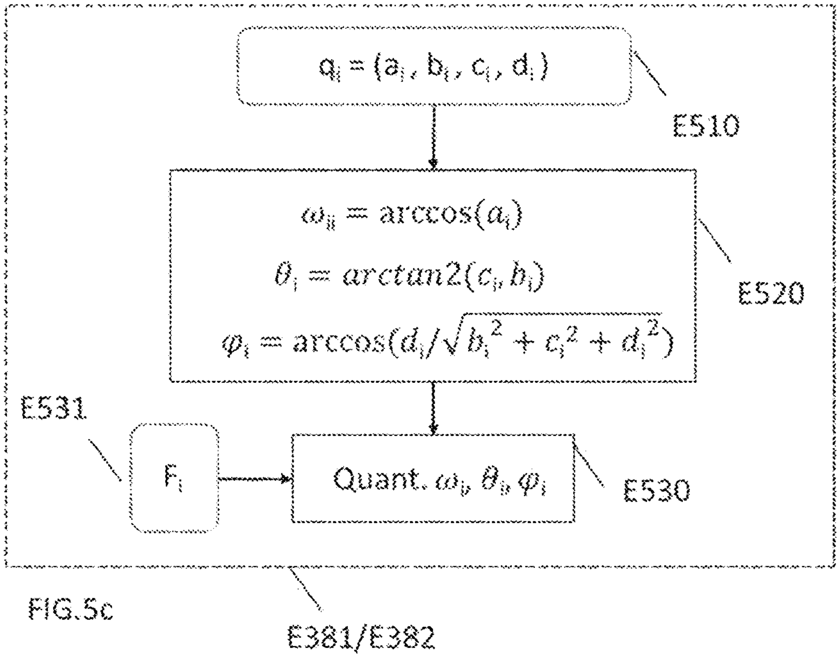
FIG.5c
FIG.5d
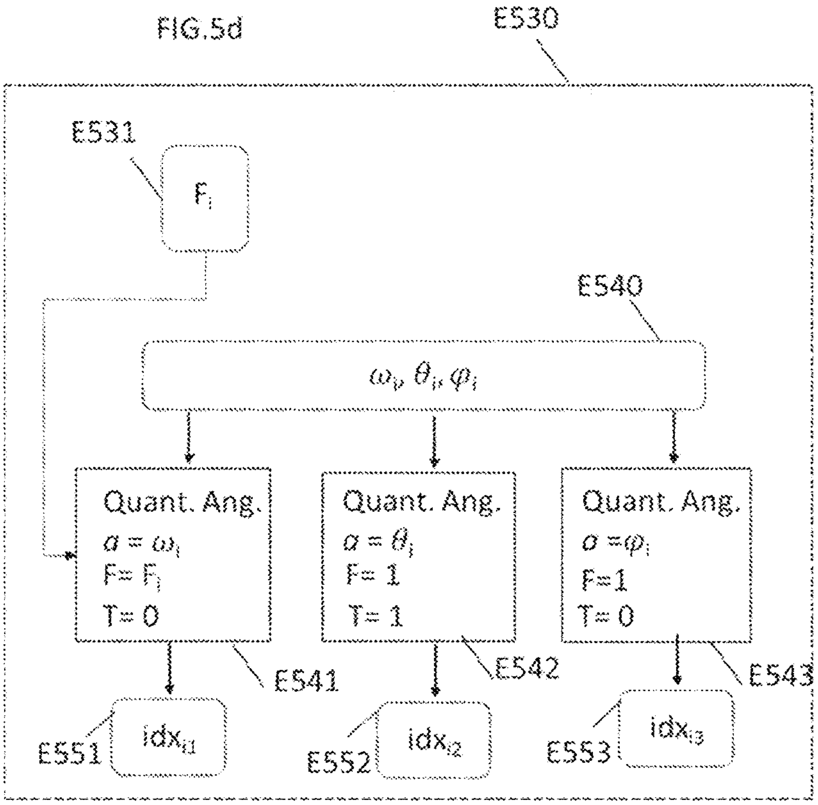

OPTIMIZED ENCODING OF ROTATION MATRICES FOR ENCODING A MULTICHANNEL AUDIO SIGNAL

CROSS-REFERENCE TO RELATED APPLICATIONS

This Application is a Section 371 National Stage Application of International Application No. PCT/FR2021/052257, filed Dec. 9, 2021, which is incorporated by reference in its entirety and published as WO 2022/136760 A1 on Jun. 30, 2022, not in English.

FIELD OF THE DISCLOSURE

The present disclosure relates to the encoding/decoding of spatial sound data, in particular within the ambiophonics context (hereafter also referred to as "ambisonics").

BACKGROUND OF THE DISCLOSURE

The encoders/decoders (hereafter called "codecs") that are currently used in mobile telephony are mono (a single signal channel for rendering on a single loudspeaker). The 3GPP EVS ("Enhanced Voice Services") codec allows "Super-HD" quality (also called "High Definition Plus" or HD+ voice) to be provided with a super-wideband (SWB) audio band for signals sampled at 32 or 48 kHz or with a full band (FB) for signals sampled at 48 kHz; the audio bandwidth ranges from 14.4 to 16 kHz in SWB mode (from 9.6 to 128 Kbit/s) and from 20 kHz in FB mode (from 16.4 to 128 Kbit/s).

The next evolution of quality in the conversational services offered by operators should be made up of immersive services, using terminals such as smartphones equipped with several microphones or spatial audio conference or video conference equipment of the telepresence or 360° video type, or even equipment for sharing "live" audio content, with 3D spatial sound rendering that is even more immersive than simple 2D stereo rendering. With the increasingly widespread uses of listening on a mobile phone with headphones and the emergence of advanced audio equipment (accessories such as a 3D microphone, voice assistants with acoustic antennas, virtual reality headsets, etc.) picking up and rendering spatial sound scenes are now fairly widespread for providing an immersive communication experience.

In this respect, the future 3GPP "IVAS" (Immersive Voice and Audio Services) standard proposes extending the EVS codec to Immersive audio by accepting, as the input format of the codec, at least the spatial sound formats listed below (and the combinations thereof):

- multichannel format (channel-based) of the stereo or 5.1 type, where each channel supplies a loudspeaker (for example, L and R in stereo or L, R, Ls, Rs and C in 5.1);
- object format (object-based) where sound objects are described as an audio signal (in general mono) associated with metadata describing the attributes of this object (position in space, spatial width of the source, etc.);
- ambisonic format (scene-based), which describes the sound field at a given point, generally picked up by a spherical microphone or synthesized in the field of spherical harmonics.

Typically, encoding a sound in the ambisonic format is of interest hereafter, by way of an embodiment (with at least some aspects presented hereafter with respect to the invention also being able to be applied to formats other than the ambisonic format).

Ambisonics is a method for recording ("encoding" in the acoustic sense) spatial sound and a reproduction system ("decoding" in the acoustic sense). An ambisonic microphone (first order) comprises at least four capsules (typically of the cardioid or sub-cardioid type) arranged on a spherical grid, for example, the vertices of a regular tetrahedron. The audio channels associated with these capsules are referred to as "A-format" channels. This format is converted into a "B-format", in which the sound field is broken down into four components (spherical harmonics) denoted W, X, Y, Z, which correspond to four coincident virtual microphones. The component W corresponds to an omnidirectional pick up of the sound field, while the more directional components X, Y and Z are similar to microphones with pressure gradients oriented along the three orthogonal axes of the space. An ambisonic system is a flexible system in the sense that recording and rendering are separated and decoupled. It allows decoding (in the acoustic sense) on any configuration of loudspeakers (for example, binaural, 5.1 type "surround" sound or 7.1.4 type peritelephony (with elevation)). The ambisonic approach can be generalized to more than four B-format channels and this generalized representation is commonly referred to as "HOA" (Higher-Order Ambisonics). Breaking down the sound over more spherical harmonics improves the spatial rendering accuracy when rendering on loudspeakers.

An M-order ambisonic signal includes $K=(M+1)^2$ components and, for the first-order (if M=1), the four components W, X, Y, and Z are found, commonly called FOA (First-Order Ambisonics). There is also a variant of the ambisonics (W, X, Y), called "planar" ambisonics, that breaks down the defined sound in a plane that is generally the horizontal plane (where Z=0). In this case, the number of components is K=2M+1 channels. First-order ambisonics (4 channels: W, X, Y, Z), first-order planar ambisonics (3 channels: W, X, Y), as well as higher order ambisonics are all equally referred to hereafter as "ambisonics" to facilitate reading, with the described processes being applicable independently of the planar or non-planar type and of the number of ambisonic components. If, however, in some passages a distinction needs to be made, the terms "first-order ambisonics" and "first-order planar ambisonics" are used.

Hereafter, a B-format signal will be called "ambisonic signal" with a predetermined order with a certain number of ambisonic components. In variants, the ambisonic signal can be defined in another format, such as the A-format or channels pre-combined by fixed matrixing.

The signals to be processed by the encoder/decoder are in the form of series of blocks of sound samples, called "frames" or "sub-frames" hereafter. Furthermore, hereafter, the mathematical notations are in accordance with the following convention:

- Scalar: s or N (lower case for variables or upper case for constants);
- Vector: q (lower case, bold and italics);
- Matrix: M (upper case, bold and italics).

The simplest approach for encoding an ambisonic signal involves using a mono encoder (for example, EVS) and simultaneously applying this mono encoder to all the channels, optionally with a different allocation of the bits as a function of each input channel. This approach is called "multi-mono" approach herein. The multi-mono approach can be extended to multi-stereo encoding (where pairs of channels are encoded separately by a stereo codec) or, more generally, to the use of several parallel instances of the same core codec.

In multi-mono encoding, the input signal is divided into channels (mono) that are encoded individually. After decoding, the channels are recombined. The associated quality varies according to the mono-encoding that is used, and it is generally only satisfactory at a very high rate, for example, with a rate of at least 48 Kbit/s per mono channel for EVS encoding. Thus, for the first-order, a minimum rate of 4×48=192 Kbit/s is acquired.

Since the multi-mono encoding approach does not take into account the correlation between channels, at a low rate it produces spatial deformations with the addition of various artefacts such as the appearance of phantom sound sources, diffuse noises or movements of the trajectories of sound sources. Thus, encoding an ambisonic signal according to this approach leads to degradations of the spatialization.

Various more advanced solutions have been proposed for encoding ambisonic signals. A particular approach to ambisonic encoding is of interest in the invention, using the quantization and interpolation of rotation matrices, as described, for example, in patent application WO 2020/177981.

In this approach, 4×4 rotation matrices (derived from a PCA/KLT analysis as described, for example, in the aforementioned patent application) are converted, for example, into 6 generalized Euler angles, which are encoded by uniform scalar quantization, before applying an inverse conversion, in order to find matrices of decoded rotations, then an interpolation is applied by sub-frames in the quaternion domain. By way of a reminder, a method for converting a rotation matrix into generalized Euler angles is provided in the article entitled, "Generalization of Euler angles to N-Dimensional Orthogonal Matrices" by David K. Hoffman, Richard C. Raffenetti, and Klaus Ruedenberg, published in the Journal of Mathematical Physics 13, 528(1972).

The strategy of this type of ambisonic encoding is to de-correlate the channels of the ambisonic signal as much as possible and to then encode them separately with a core codec (for example, multi-mono). This strategy allows the artefacts in the decoded ambisonic signal to be limited.

More specifically, an optimized decorrelation of the input signals is applied before encoding (for example, multi-mono). Moreover, the domain of quaternions allows the transformation matrices computed for the PCA/KLT analysis to be interpolated rather than repeating a decomposition into Eigen values and Eigen vectors several times per frame; with the transformation matrices being rotation matrices, for the decoding, the inverse matrixing operation is carried out simply by transposing the matrix applied to the encoding.

FIG. 1 illustrates the encoding according to this approach of the prior art. The encoding occurs in several steps:

- The signals of the channels (for example, W, Y, Z, X for the case of FOA) are assumed to be in a matrix form X with a matrix n×L (for n ambisonic channels (in this case 4) and L samples per frame). These channels optionally can be pre-processed, for example, by a high-pass filter;
- A main PCA component analysis, or equivalently a Karhunen Loeve (KLT) transform, is applied to these signals, with estimation of the covariance matrix (block 100) and a decomposition into Eigen values denoted EVD (Eigen Value Decomposition) (block 110), in order to acquire Eigen values and a matrix of Eigen vectors from a covariance matrix of the n signals;
- The matrix of Eigen vectors, acquired for the current frame t, undergoes signed permutations (block 120) so that it is aligned as much as possible with the same type of matrix as the preceding frame t−1, in order to ensure maximum coherence between the matrices between two frames. Furthermore, provision is made in the block 120 so that the matrix of Eigen vectors of the current frame t, thus corrected by signed permutations, actually represents the application of a rotation;
- The matrix of Eigen vectors for the current frame t (which is a rotation matrix) is converted into an appropriate domain of quantization parameters (block 130). In one embodiment of patent application WO 2020/177981, the parameters correspond to 6 generalized Euler angles for a 4×4 matrix; there would be 3 Euler angles for a 3×3 matrix. These parameters are then encoded (block 140) on a number of bits allocated to the quantization of parameters. A scalar quantization of the generalized Euler angles can be used, for example, with an identical quantization pitch for each angle.
- In one embodiment of patent application WO 2020/177981, the decoded parameters (in the form of generalized Euler angles) are converted into a rotation matrix (block 142), then the rotation matrix thus acquired is converted into quaternions (block 143). The current frame is cut into sub-frames, the number of which can be fixed or adaptive, in the latter case, this number can be determined as a function of the information derived from the PCA/KLT analysis and it can be transmitted optionally (block 150). The quaternion representation is interpolated (block 160) by successive sub-frames from the previous frame t−1 to the current frame t, in order to smooth the difference between matrixing over time. The interpolated quaternions in each sub-frame are converted into rotation matrices (block 162) and then the resulting decoded and interpolated rotation matrices (block 170) are applied. In each frame, a matrix n×(L/K) representing each of the K sub-frames of the signals of the ambisonic channels is acquired at the output of the block 170 in order to decorrelate these signals as much as possible before the encoding (for example, multi-mono encoding). A binary allocation to the separate channels is also carried out.

FIG. 2 illustrates the corresponding decoding.

The quantization indices of the quantization parameters of the rotation matrix in the current frame are decoded in the block 200. The conversion and interpolation steps (blocks 242, 243, 260, 262) of the decoder are identical to those carried out on the encoder (blocks 142, 143, 160 and 162). If the number of interpolation sub-frames is adaptive, this is decoded (block 210), otherwise, this number of interpolation sub-frames is set to a predetermined value.

The block 220 applies, per sub-frame, the inverse matrixing originating from the block 262 to the decoded signals of the ambisonic channels; by way of a reminder, the inverse of a rotation matrix is its transpose.

In the aforementioned patent application, the quantization of the 3×3 or 4×4 rotation matrices is preferably carried out in the domain of Euler angles (3×3 case) or generalized Euler angles (4×4 case) and the interpolation is carried out in the domain of quaternions. This involves multiple conversions between the matrix and various parameters, and therefore increased complexity since two different types of parameters are used for the quantization and the interpolation. Moreover, the conversion to Euler angles, in particular, for the generalized Euler angles according to the method described in the article by Hoffman et al., can raise certain issues in practice, since it can be digitally 'unstable', in the sense that the combination of the direct and inverse conversion (of the matrix with Euler angles followed by the inverse conversion) may not exactly restore the original matrix (even in the absence of quantization of the angles) and the quantization can induce issues such as "gimbal lock", which involves losing a degree of freedom, which occurs when the axes of two of the three gimbals required for applying or compensating the rotations in the three-dimensional space are supported by the same direction. In such cases, PCA/KLT decorrelation is no longer optimal.

It would be more advantageous to resort to only one type of parameters for encoding the rotation matrices and for their interpolation, a conversion of the rotation matrix can be carried out in the quaternion domain and a quantization of parameters resulting from this conversion can be carried out in order to replace the quantization of parameters such as the Euler angles (which may or may not be generalized). In the literature, no effective methods are found for encoding a quaternion or a dual quaternion with the constraint of representing a rotation matrix with similar precision to the quantization of Euler angles (which may or may not be generalized) and with a given bit budget;

for example, approximately 25 bits/quaternion or 50 bits/dual quaternion.

Therefore, a requirement exists for optimizing this quantization of parameters in terms of rate and/or complexity and/or storage of information.

SUMMARY

An exemplary aspect of the present disclosure relates to a method for encoding a multichannel audio signal, comprising forming a transformation matrix in the form of a rotation matrix to be applied to the input signals, quantizing the rotation matrix and encoding the transformed signals after applying the rotation matrix, wherein quantizing the rotation matrix comprises the following operations:

- converting the rotation matrix in the quaternion domain with at least one first quaternion;
- forcing said first quaternion to have a positive component;
- converting the at least one first quaternion into spherical coordinates, with one of the spherical coordinates being associated with the positive forced component of the first quaternion;
- quantizing the acquired spherical coordinates, with the spherical coordinate associated with the positive forced component of the first quaternion being quantized over a half-length interval.

The quantization of the quaternions for encoding the rotation matrix allows multiple conversions to be avoided since the quaternion domain is also used to interpolate the rotation matrix before applying this matrix to the multichannel signal.

This quantization is further optimized to restrict the rate to be used by forcing one of the parameters of a quaternion to be positive and thus to encode only the relevant positive quaternion, with the negative quaternion corresponding to the same rotation. The conversion into spherical coordinates and the quantization of these spherical coordinates allows a quantization method to be used that does not require the use of onerous dictionaries both in terms of memory space and of processing capacity. Quantization over half an interval also allows a saving to be provided in terms of the rate.

In a particular embodiment, the positive component of said first quaternion is its real component.

In a simple manner, the real component ($a_1$) of the first quaternion is selected by convention.

In one embodiment, the rotation matrix is converted into a dual quaternion, a first quaternion for which a component is forced to be positive and a second quaternion.

According to one embodiment, the quantization of the first quaternion uses one bit less than the quantization of the second quaternion. The rate is thus optimized.

In one embodiment, converting each of the two quaternions of the dual quaternion into spherical coordinates yields three angles, and the quantization of the angle associated with the positive component of the first quaternion is carried out at a half-length interval relative to the interval used to quantize the same component in the second quaternion.

Acquiring these angles that are acquired for each quaternion allows parameters to be acquired that are less complex to be quantized. Indeed, quantizing the angles thus acquired rather than quantizing the quaternion in question is less complex since it does not necessarily require the use of onerous dictionaries both in terms of memory space and of processing capacity.

Taking into account the positive component of the first quaternion allows a quantization to be carried out over a restricted interval on this quaternion, which minimizes the rate to be allocated for the quantization of this quaternion.

In a particular embodiment of this embodiment, the quantization of the six acquired angles is carried out by uniform scalar quantization.

This quantization method is simple and not very complex.

In another particular embodiment, the quantization of the six acquired angles is carried out by vector quantization with a hyper-rectangular support.

This quantization method is another simple and not very complex alternative.

In a particular embodiment, a binary indication is also encoded to indicate whether the at least one first quaternion assumes default values.

The default values of the quaternions typically can be such that q=(1, 0, 0, 0,), which indicates that the transformation matrix is an identity matrix. In this case, if the binary indication indicates that the quaternions assume these default values, this indicates that the transformation is deactivated for the current frame.

An aspect also relates to a method for decoding a multichannel audio signal, comprising receiving encoded signals originating from a multichannel signal and further comprising the following operations:

- receiving parameters of quantized spherical coordinates of a set of at least one first quaternion and an indication of the existence of a positive component;
- decoding the at least one first quaternion from the received quantized parameters by taking a half-length quantization interval in order to decode a spherical coordinate associated with the indicated positive component;
- constructing an inverse rotation matrix from the at least one first decoded quaternion;
- applying said inverse rotation matrix to the received encoded signals, before decoding said signals.

Thus, the decoder can receive and decode a set of quaternions that allows a rotation matrix to be constructed that is useful for decoding the multichannel signal.

Acquiring a positivity index of a component of at least one quaternion allows suitable decoding to be applied, by decoding only the positive quaternion in order to deduce the negative quaternion therefrom.

This set of quaternions also allows it to be used for interpolating the acquired rotation matrix, without having to carry out other conversions of this matrix, in order to acquire an interpolated matrix applicable to the signals of the multichannel signal.

This set of quaternions can be decoded with less complexity, in particular when the encoded parameters are angles derived from a dual quaternion.

An inverse scalar quantization method can be implemented in this case, for example.

An aspect also relates to an encoding device comprising a processing circuit for implementing the encoding method as described above. An aspect also relates to a decoding device comprising a processing circuit for implementing the decoding method as described above. An aspect relates to a computer program comprising instructions for implementing the encoding or decoding methods as described above, when they are executed by a processor.

Finally, An aspect relates to a processor-readable storage medium storing a computer program comprising instructions for executing the encoding or decoding methods described above.

BRIEF DESCRIPTION OF THE DRAWINGS

Further features and advantages of aspects of the disclosure will become more clearly apparent upon reading the following description of particular embodiments, which are provided by way of simple illustrative and non-limiting examples, and from the accompanying drawings, in which:

FIG. 5*c* uses a flowchart to illustrate the steps implemented when quantizing a quaternion according to a first embodiment of the disclosure;

FIG. 5*d* uses a flowchart to illustrate the steps implemented when quantizing the angles derived from a quaternion according to a first embodiment of the disclosure;

DETAILED DESCRIPTION OF ILLUSTRATIVE EMBODIMENTS

Figure 1:
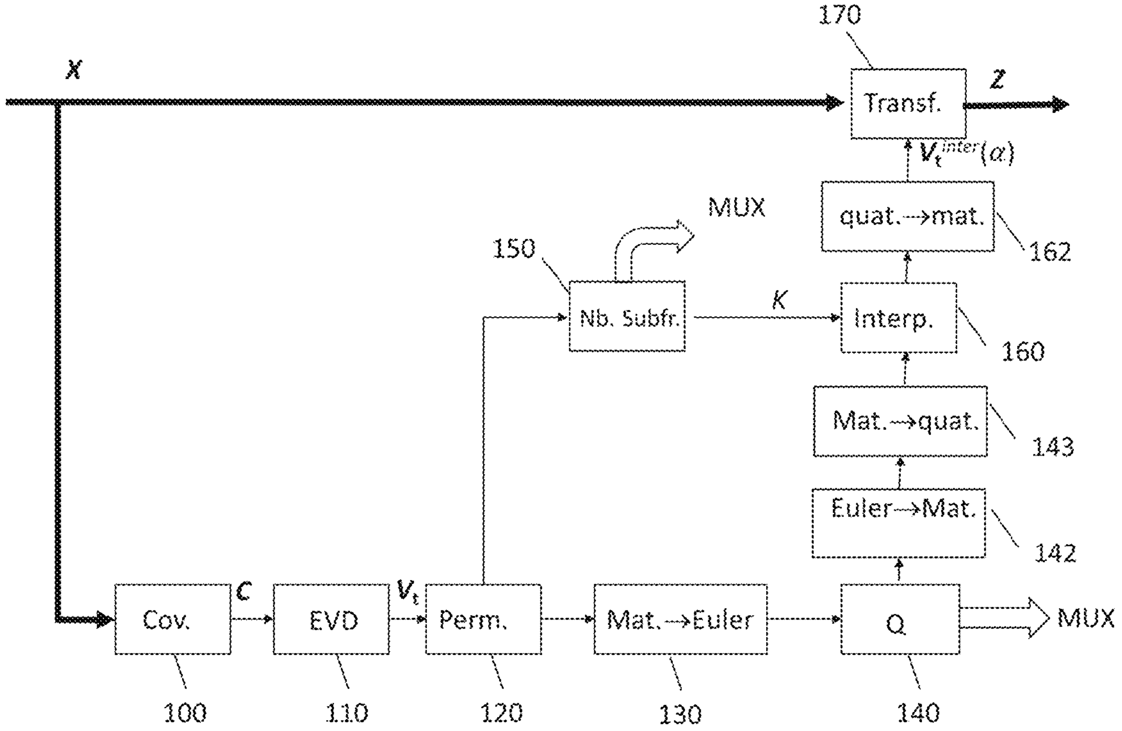
FIG. 1 illustrates an embodiment of an encoder and of an encoding method according to a method of the prior art.
Figure 3:
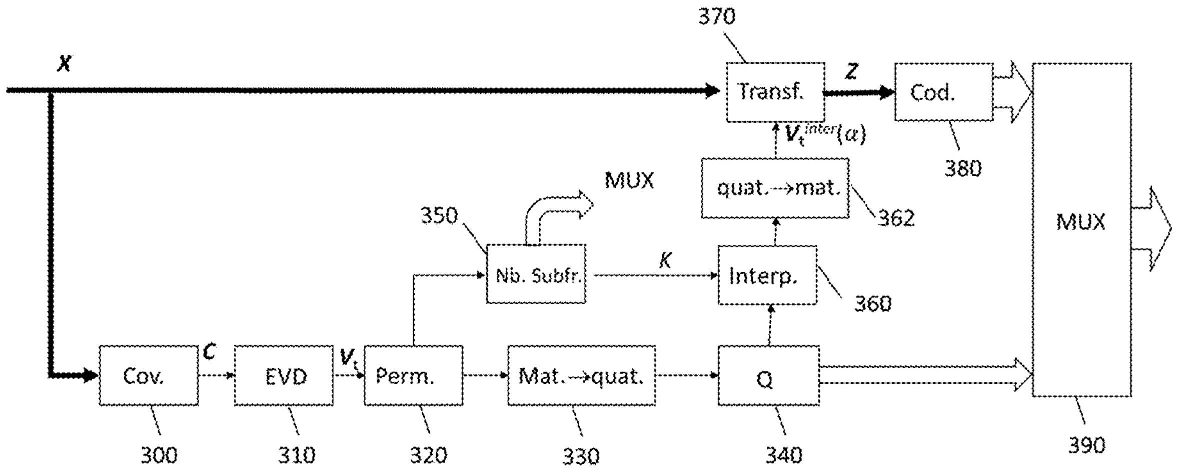
FIG. 3 illustrates an embodiment of an encoder and of an encoding method according to an aspect of the disclosure.

FIG. 3 illustrates an embodiment of the encoding method and of an encoder according to an aspect of the disclosure. The blocks 300, 310 and 320 for KLT/PCA analysis per frame are, in one embodiment, identical to the blocks 100, 110 and 120 of FIG. 1 described above; the quaternion interpolation blocks 350, 360 are identical to the blocks 150 and 160 of FIG. 1 and the inverse conversion 362 and matrixing 370 blocks are identical to the blocks 162 and 170 of FIG. 1. However, an aspect of the disclosure applies to cases where a different implementation is used for each of these blocks.

A more detailed description of these blocks can be found in the aforementioned patent application. The block for encoding the transformed signals (block 380), which can be multi-mono encoding or any other type of multichannel coding, has been explicitly added herein, as has the multiplexing block (block 390), which forms the bit stream or the payload of an encoded data packet. The difference from FIG. 1 particularly lies in the conversion into quaternions (block 330), followed by an optimized quantization (block 340), which is described hereafter with reference to FIGS. 5*a* to 5*e*, and in the multiplexing (block 390).

Figure 2:
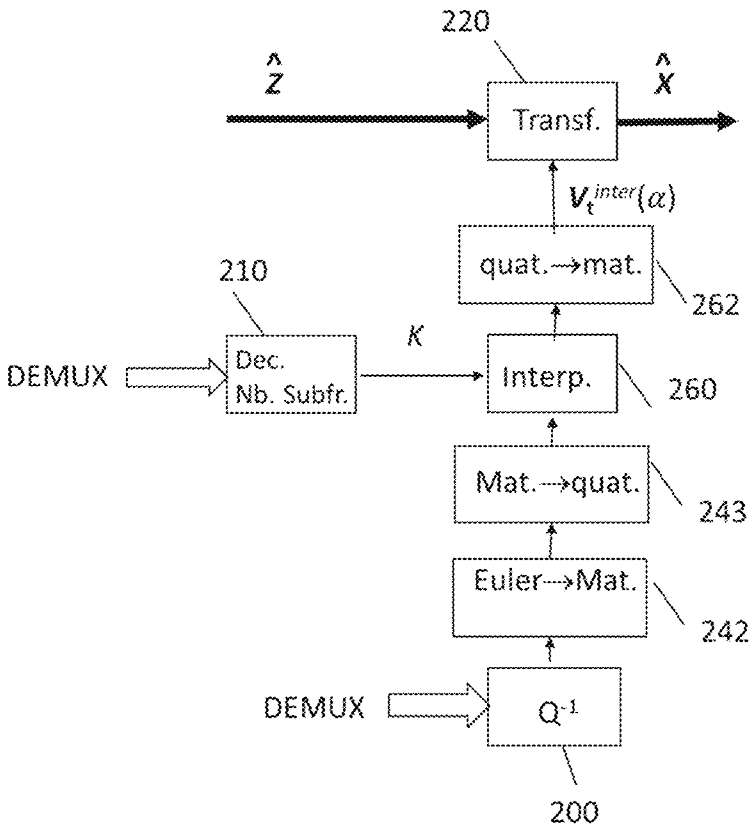
FIG. 2 illustrates an embodiment of a decoder and of a decoding method according to a method of the prior art.
Figure 4:
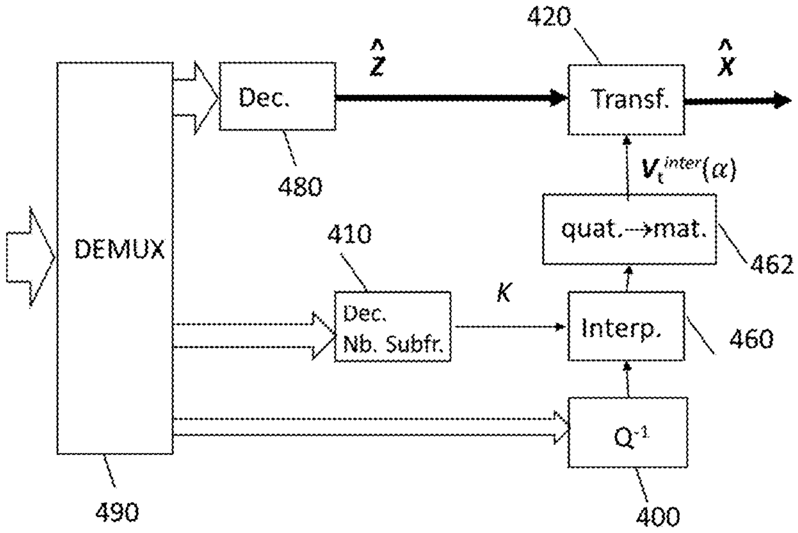
FIG. 4 illustrates an embodiment of a decoder and of a decoding method according to an aspect of the disclosure.

FIG. 4 illustrates the corresponding decoding. Here again, the quaternion interpolation blocks (blocks 410 and 460) identical to the blocks 210 and 260 of FIG. 2 are found, as well as the inverse conversion block 462 identical to the block 262 of FIG. 2 and the matrixing block 420, identical to the block 220 of FIG. 2. Again, the blocks for decoding the transformed signals (block 480) and the demultiplexing block 490 have also been explicitly added. In this case, an aspect of the disclosure relates to the optimized decoding of quaternions in the block 400 described hereafter with reference to FIGS. 6*a* and 6*b*, and in the demultiplexing (block 490).

By way of a reminder, some explanatory concepts relating to the rotations in dimension n and their conversion into quaternions in the 3×3 case and dual quaternions in the 4×4 case are provided in this case. As described in the aforementioned patent application, the encoding method uses a representation of the rotations in dimension n=3 or 4, with parameters suitable for a quantization per frame and an efficient interpolation per sub-frame. Some representations of rotations are defined hereafter, which can be used in 3 and 4 dimensions, and the focus is on the 4 dimensions in the preferred embodiment.

A rotation (around the origin) is a transformation of the space in dimension n that changes one vector into another vector, such that:

- The amplitude of the vector is preserved;
- The vector product of vectors defining an orthonormal coordinate system before rotation is preserved after rotation (there is no reflection).

A matrix M of size n×n is a rotation matrix if and only if $M^T M = I_n$, where $I_n$ denotes the identity matrix of size n×n (i.e., M is a unit matrix, with $M^T$ designating the transpose of M) and its determinant is equal to +1. Incidentally, it should be noted that the inverse of M is its transpose.

There are several representations equivalent to the representation per rotation matrix.

In the three-dimensional (3D) space (n=3): the Euler angles, the quaternions (unit), or even a representation per axis-angle are often used as a representation of a 3D rotation, with the representation per axis-angle not being described herein. The representation of 3 Euler angles is derived from the fact that a 3×3 rotation matrix can be broken down into a product of 3 elementary rotation matrices; the elementary rotation matrices with the angle θ along the axes x, y, or t are provided below:

$$M_{3,x}(\theta)=\begin{pmatrix}1 & 0 & 0\\ 0 & \cos\theta & -\sin\theta\\ 0 & \sin\theta & \cos\theta\end{pmatrix}$$

$$M_{3,y}(\theta)=\begin{pmatrix}\cos\theta & 0 & \sin\theta\\ 0 & 1 & 0\\ -\sin\theta & 0 & \cos\theta\end{pmatrix}$$

$$M_{3,z}(\theta)=\begin{pmatrix}\cos\theta & -\sin\theta & 0\\ \sin\theta & \cos\theta & 0\\ 0 & 0 & 1\end{pmatrix}$$

Depending on the combinations of axes and depending on whether the axes are defined as absolute or relative, the angles are said to be Euler or Cardan angles.

A 3D rotation also can be represented by a quaternion. Quaternions are a generalization of the complex numbers with four components in the form of a number q=a+bi+cj+dk where $i^2=j^2=k^2=ijk=-1$.

The real part a is called scalar part and the three imaginary parts (b, c, d) form a 3D vector. The norm of a quaternion is $\lambda a \lambda=\sqrt{a^2+b^2+c^2+c^2}$. The unit quaternions (norm 1) represent the rotations; however, this representation is not unique; thus, if q represents a rotation, −q represents the same rotation.

Hereafter, the term quaternion is to be understood in the sense of a unit quaternion, and the qualifier "unit" is not systematically used, except by way of timely reminders, for the sake of conciseness.

It should be noted that, in the literature, the quaternion q=a+bi+cj+dk is generally considered to be a 4-dimensional vector (a, b, c, d); sometimes, the real part is permutated as (b, c, d, a); subsequently, with no loss of generality, the convention is assumed on the order of the elements in the form of (a, b, c, d). Hereafter, each of the elements a, b, c, d will be referred to as a component of a quaternion. Thus, a is also referred to hereafter as the real component of q.

Considering a unit quaternion q=a+bi+cj+dk (with $a^2+b^2+c^2=1$), the associated 3D rotation matrix is:

$$M_{3,quat}(q)=\begin{pmatrix}a^2+b^2-c^2-d^2 & 2(bc-ad) & 2(ac+bd)\\ 2(ad+bc) & a^2-b^2+c^2-d^2 & 2(cd-ab)\\ 2(bd-ac) & 2(ab+cd) & a^2-b^2-c^2+d^2\end{pmatrix}$$

Conversely, for a 3×3 rotation matrix, an associated quaternion (to the nearest sign) can be determined; indeed, q and −q represent the same matrix $M_{3,quat}(q)=M_{3,quat}(-q)$. A method for converting $M_{3,quat}(q)$ to ±q is described below with respect to block 330.

The Euler angles do not allow 3D rotations to be correctly interpolated; to this end, the quaternions are used instead. The SLERP (Spherical Linear Interpolation) interpolation method involves interpolating according to the following formula:

$$slerp(q_1,q_2,\alpha)=\frac{\sin(1-\alpha)\Omega}{\sin\Omega}q_1+\frac{\sin\alpha\Omega}{\sin\Omega}q_2$$

where 0≤α>1 is the interpolation factor for proceeding from $q_1$ to $q_2$ and Ω is the angle between the two quaternions:

$$\Omega=\arccos(q_1.q_2)$$

where $q_1.q_2$ designates the scalar product between two quaternions (identical to the scalar product between two 4-dimensional vectors). This amounts to interpolating by following a large circle over a 4D sphere with a constant angular speed as a function of α. It is worthwhile ensuring that the shortest path is used for interpolating by changing the sign of one of the quaternions when $q_1.q_2<0$. It should be noted that other quaternion interpolation methods can be used (NLERP "Normalized Linear Interpolation" that amounts to interpolating on a chord and renormalizing the result, splines, etc.).

In 4-dimensions (n=4), a rotation can be parameterized by $$\frac{n(n-1)}{2}=6$$

generalized Euler angles as indicated in the aforementioned patent application.

In this case, the dual quaternion representation is of interest. This representation requires recourse to the matrix form of a quaternion.

The 4×4 matrices, herein called quaternion (Q) and anti-quaternion (Q*), associated with a quaternion (unit) q=a+bi+cj+dk are defined by:

$$Q=\begin{pmatrix}a & -b & -c & -d\\ b & a & -d & c\\ c & d & a & -b\\ d & -c & b & a\end{pmatrix}$$

And $$Q^*=\begin{pmatrix}a & -b & -c & -d\\ b & a & d & -c\\ c & -d & a & b\\ d & c & -b & a\end{pmatrix},$$

which corresponds to the "column convention", since a quaternion is then represented as a 4D column vector. The matrices Q and Q* respectively correspond to a left multiplication by q and a right multiplication by q.

It is possible to check that the product of the two quaternions $q_1q_2$ is acquired in the same way in the matrix form:

$$q_1q_2=Q_1\begin{pmatrix}a_2\\ b_2\\ c_2\\ d_2\end{pmatrix}=Q_2^*\begin{pmatrix}a_1\\ b_1\\ c_1\\ d_1\end{pmatrix}$$

where, for the quaternions $q_1=a_1+b_1i+c_1j+d_1k$ and $q_2=a_2+b_2i+c_2j+d_2k$, with:

$$Q_1=\begin{pmatrix} a_1 & -b_1 & -c_1 & -d_1 \\ b_1 & a_1 & -d_1 & c_1 \\ c_1 & d_1 & a_1 & -b_1 \\ d_1 & -c_1 & b_1 & a_1 \end{pmatrix}$$

And $$Q_2^*=\begin{pmatrix} a_2 & -b_2 & -c_1 & -d_2 \\ b_2 & a_2 & d_2 & -c_2 \\ c_2 & -d_2 & a_2 & b_2 \\ d_2 & c_2 & -b_2 & a_2 \end{pmatrix}$$

Considering two unit quaternions $q_1$ and $q_2$, the product of $Q_1$ and $Q_2^*$ yields a 4×4 matrix, which confirms the properties of a rotation matrix (unit matrix and determinant equal to 1):

$$M_{4,quat}(q_1q_2)=Q_1Q_2^*$$

It should be noted that $M_{4,quat}(q_1,q_2)=M_{4,quat}(q_2,q_1)$

Conversely, considering a 4×4 rotation matrix, it is possible to find an associated dual quaternion ($q_1$, $q_2$) and the corresponding quaternion and anti-quaternion matrices. In other words, this matrix can be factorized into a product of matrices in the form $Q_1Q_2^*$, for example, with the method referred to as the "Cayley factorization" method. This generally involves computing an intermediate matrix, called "associated matrix" (or "tetragonal transform") and deducing therefrom the quaternions to the nearest indeterminacy on the sign of the two quaternions. It should be noted that $M_{4,quat}(q_1,q_2)=M_{4,quat}(-q_1,-q_2)$; this property is used within the scope of the disclosure for more efficiently encoding the quaternions.

In variants, the definition of the quaternion and anti-quaternion matrices can assume various conventions. For example:

row convention:

$$Q=\begin{pmatrix} a & b & c & d \\ -b & a & -d & c \\ -c & d & a & -b \\ -d & -c & b & a \end{pmatrix}$$

And $$Q^*=\begin{pmatrix} a & -b & -c & -d \\ b & a & -d & c \\ c & d & a & -b \\ d & -c & b & a \end{pmatrix}$$

the convention of the article that permutates some components and changes some signs:

$$Q_1=\begin{pmatrix} a_1 & -d_1 & c_1 & -b_1 \\ d_1 & a_1 & -b_1 & -c_1 \\ -c_1 & b_1 & a_1 & -d_1 \\ b_1 & c_1 & d_1 & a_1 \end{pmatrix}$$

And $$Q_2^*=\begin{pmatrix} a_2 & -d_2 & c_2 & b_2 \\ d_2 & a_2 & -b_2 & c_2 \\ -c_2 & b_2 & a_2 & d_2 \\ -b_2 & -c_2 & -d_2 & a_2 \end{pmatrix}$$

In general, it is possible to insert a signed permutation matrix into the Cayley factorization and the present disclosure is applicable in all these cases. For the sake of simplification, and with no loss of generality, only one example of a convention (the "column convention" described above) is described hereafter at the output of the block 330 that allows a dual quaternion ($q_1$, $q_2$) to be acquired in the form of two 4D vectors to be encoded.

These alternative conventions affect the block 330 for converting a dual quaternion matrix (in particular the computation of the "associated matrix") and affect the inverse block 362 and 462 that computes (explicitly or in an optimized manner) the product of matrices in the form of $Q_1Q_2^*$. A person skilled in the art will know how to adapt this computation as a function of the adopted convention.

The 3×3 and 4×4 cases are linked by the fact that a 3D rotation can be seen as a 4×4 rotation with the constraint: $q_1=q$ and $q_2=-q$. In this case, $$M_{4,quat}(q,-q)=QQ^*=\begin{pmatrix} 1 & 0 \\ 0 & M_{3,quat}(q) \end{pmatrix}$$

As for the 4×4 case, for the sake of simplification and with no loss of generality, only one example of a convention (the "column convention" as described above) is described hereafter.

As described with reference to FIG. 3, an aspect of the disclosure relates to an encoder and an encoding method, in which the blocks 330 and 340 implement a conversion of the rotation matrix resulting from a KLT/PCA analysis and a quantization of the parameters of this matrix in an optimized manner.

An aspect of the disclosure prevents a representation different from that used in the block 360 for the interpolation from being acquired.

According to the an aspect of the disclosure, the 3- and 4-dimension matrices are preferably selected to be quantized in the domain of quaternions and dual quaternions (respectively), which means it is possible to remain in the same domain for the quantization and the interpolation.

More specifically, the case of a 4-dimensional matrix in the embodiment that will now be described is of interest.

The PCA/KLT analysis and the PCA/KLT transformation as described in patent application WO 2020/177981 are carried out in the time domain. However, an aspect of the disclosure also applies to the case whereby a PCA/KLT analysis is carried out, for example, in a frequency domain with an estimate of a (real) covariance matrix by sub-bands.

The encoding method according to an aspect of the disclosure implements the steps described with reference to FIG. 3. The block 330 converts the rotation matrix into dual quaternions for the 4D case.

This conversion can be carried out as follows for a rotation matrix $M_{4,quat}(q_1,q_2)$, in this case denoted $M=(m_{ij})_{i,j=0,\ldots,3}$ in order to simplify the developments:

The intention is to factorize M in the form $M=Q_1Q_2^*$:

$$Q_1=\begin{pmatrix} a_1 & b_1 & c_1 & d_1 \\ -b_1 & a_1 & -d_1 & c_1 \\ -c_1 & d_1 & a_1 & -b_1 \\ -d_1 & -c_1 & b_1 & a_1 \end{pmatrix}$$

And $$Q_2^*=\begin{pmatrix} a_2 & -b_2 & -c_2 & -d_2 \\ b_2 & a_2 & -d_2 & c_2 \\ c_2 & d_2 & a_2 & -b_2 \\ d_2 & -c_2 & b_2 & a_2 \end{pmatrix}$$

It can be seen that this factorization is equivalent to solving:

$$\begin{pmatrix} a_1a_2 & a_1b_2 & a_1c_2 & a_1d_2 \\ b_1a_2 & b_1b_2 & b_1c_2 & b_1d_2 \\ c_1a_2 & c_1b_2 & c_1c_2 & c_1d_2 \\ d_1a_2 & d_1b_2 & d_lc_2 & d_ld_2 \end{pmatrix} = U$$

where U is the "associated matrix" of M acquired from the coefficients $m_{ij}$ of M as follows:

$$U = \frac{1}{4}\begin{pmatrix} m_{00}+m_{11}+m_{22}+m_{33} & m_{10}-m_{01}-m_{32}+m_{23} & m_{20}+m_{31}-m_{02}-m_{13} & m_{30}-m_{21}+m_{12}-m_{03} \\ m_{10}-m_{01}+m_{32}-m_{23} & -m_{00}-m_{11}+m_{22}+m_{33} & m_{30}-m_{21}-m_{12}+m_{03} & -m_{20}-m_{31}-m_{02}-m_{13} \\ m_{20}-m_{31}-m_{02}+m_{13} & -m_{30}-m_{21}-m_{12}-m_{03} & -m_{00}+m_{11}-m_{22}+ml_{33} & m_{10}+m_{01}-m_{32}-m_{23} \\ m_{30}+m_{21}-m_{12}-m_{03} & m_{20}-m_{31}-m_{02}-m_{13} & -m_{10}-m_{01}-m_{32}-m_{23} & -m_{00}+m_{11}+m_{22}-m_{33} \end{pmatrix}$$

Considering the coefficients $U=(u_{ij})_{i,j=0, \ldots ,3}$, the following are found row-by-row, after squaring and summing all the coefficients per row:

$$a_1^2(a_2^2+b_2^2+c_2^2+d_2^2) = \sum_{j=0}^{3} u_{0j}^2$$

$$b_1^2(a_2^2+b_2^2+c_2^2+d_2^2) = \sum_{j=0}^{3} u_{1j}^2$$

$$c_1^2(a_2^2+b_2^2+c_2^2+d_2^2) = \sum_{j=0}^{3} u_{2j}^2$$

$$d_1^2(a_2^2+b_2^2+c_2^2+d_2^2) = \sum_{j=0}^{3} u_{3j}^2$$

Which yields, as the quaternion $q_2$ is a unit quaternion (i.e., $a_2^2+b_2^2+c_2^2+d_2^2=1$):

$$a_1 = \text{sign}(u_{0k})\sqrt{\sum_{j=0}^{3} u_{0j}^2}$$

$$b_1 = \text{sign}(u_{1k})\sqrt{\sum_{j=0}^{3} u_{1j}^2}$$

-continued $$c_1 = \text{sign}(u_{2k})\sqrt{\sum_{j=0}^{3} u_{2j}^2}$$

-continued $$d_1 = \text{sign}(u_{3k})\sqrt{\sum_{j=0}^{3} u_{3j}^2}$$

By convention, the sign of the components $a_1,b_1,c_1,d_1$ is respectively provided by the sign of $u_{0k}$, $u_{1k}$, $u_{2k}$, $u_{3k}$, where k is selected over the interval 0, . . . ,3. It should be noted that the factorization has two possible solutions, since the opposite convention also would be a solution. By selecting the maximum absolute value component (non-zero guarantee since the quaternion $q_1$ is a unit quaternion) from among $a_1,b_1,c_1,d_1$, for example, and with no loss of generality $a_1\neq 0$, the following is deduced:

$$(a_2, b_2, c_2, d_2) = \frac{1}{a_1}(u_{00}, u_{01}, u_{02}, u_{03})$$

(if a component other than $a_1$ is selected, for example $b_1$, then $$\left.\frac{1}{b_1}(u_{10}, u_{11}, u_{12}, u_{13})\right).$$

Therefore, two 4D vectors $(a_1,b_1,c_1,d_1)$ and $(a_2,b_2,c_2,d_2)$ representing the dual quaternion $(q_1, q_2)$ are acquired at the output of the block 330.

The quaternion conversion for the 3D case can be carried out as follows for a matrix $M_{3,quat}(q)$ denoted $M=(a_{ij})_{ij=0, \ldots ,2}$. The 4×4 case is reused starting from the extended rotation matrix:

$$M_{4,quat}(q, -q) = QQ^* = \begin{pmatrix} 1 & 0 \\ 0 & M_{3,quat}(q) \end{pmatrix}$$

The associated matrix is simplified by:

$$U = \frac{1}{4}\begin{pmatrix} m_{00}+m_{11}+m_{22}+a_{33} & -m_{21}+m_{12} & m_{20}-m_{02} & -m_{10}+m_{01} \\ m_{21}-m_{12} & -1-m_{00}+m_{11}+m_{22} & -m_{10}-m_{01} & -m_{20}-m_{02} \\ -m_{20}+m_{02} & -m_{10}-m_{01} & -1+m_{00}-m_{11}+m_{22} & -m_{21}-m_{12} \\ m_{10}-m_{01} & -m_{20}-m_{02} & -m_{21}-m_{12} & -1+m_{00}+m_{11}-m_{22} \end{pmatrix}$$

The remainder of the factorization method remains identical, except that only a single quaternion, for example, $q_1$, has to be determined with the other one ($q_2$) being opposite; therefore, $a_1,b_1,c_1,d_1$ are determined per square root of partial sums of terms to the square of U, with a sign being determined according to the designated convention.

Therefore, a 3D vector $(a_1,b_1,c_1,d_1)$ representing the quaternion $q_1=q$ is acquired at the output of the block 330.

According to an aspect of the disclosure, the block 340 encodes the acquired quaternions, in the embodiment described herein, a dual quaternion for the 4×4 case.

Figure 5A:
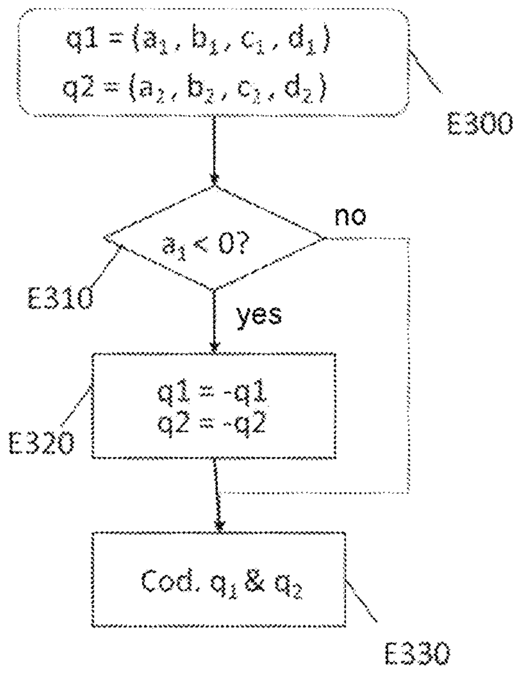
FIG. 5*a* uses a flowchart to illustrate the steps implemented by the conversion and quantization blocks when encoding a multichannel audio signal according to one embodiment of the disclosure.

Reference will now be made to FIG. 5*a* to describe, according to one embodiment of the disclosure, this operation of quantizing the acquired dual quaternion.

With reference to FIG. 5*a*, considering two unit quaternions $q_i=(a_i,b_i,c_i,d_i)$, i=1, 2, acquired by the conversion block 330, in step E300, an operation involving forcing a first quaternion, for example, $q_1$, in the dual quaternion $(q_1, q_2)$ to have a positive component is carried out in steps E310 and E320.

In a particular embodiment, it is the real component $(a_1)$ of the first quaternion that is forced to be positive, by convention.

To this end, a check is carried out in step E310 to determine whether the real component $a_i$ is negative. If so, the two quaternions $q_1$ and $q_2$ are replaced in step E320 by their opposites $-q_1$ and $-q_2$.

By way of a reminder, this operation does not change the 4D rotation matrix associated with the dual quaternion.

These two quaternions are then encoded by quantization in step E330.

Figure 5B:
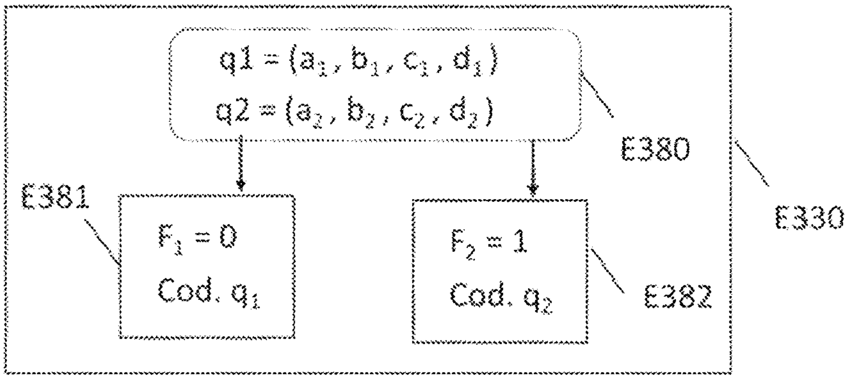
FIG. 5*b* uses a flowchart to illustrate the steps implemented when quantizing a dual quaternion according to one embodiment of the disclosure.

In a first embodiment, in order to minimize the complexity, $q_1$ and $q_2$ are quantized in step E330 by the quantization device represented by block 340 in FIG. 3 and by a method as described with reference to FIG. 5*b* that will now be described.

Considering, in step E380, two unit quaternions $q_i=(a_i,b_i,c_i,d_i)$, i=1, 2 with a first quaternion $q_1$ for which a component has been forced positive. For this quaternion, an indication of the absence of a positive component (denoted $F_1$) is set to the value 0 (since a positive component clearly exists). This indication is set to the value 1 ($F_2=1$) for the second quaternion $q_2$. The parameter F ("Full range") allows the following intervals to be distinguished [0, π/2] (F=0) and [0, π] (F=1).

A step of encoding the first quaternion $q_1$ is carried out in step E381 (Cod. $q_1$) taking into account the indication of the absence of a positive component $F_1=0$ provided for $q_1$ and a step of encoding the second quaternion $q_2$ is carried out in step E382 (Cod. $q_2$) taking into account the indication of the absence of a positive component $F_2=1$ provided for $q_2$.

These two steps will now be described with reference to FIG. 5*c*, in a particular embodiment.

From a unit quaternion $q_i=(a_i,b_i,c_i,d_i)$, in step E510, this quaternion is converted in step E520 into three angles $(\omega_i,\theta_i,\varphi_i)$, which are similar to spherical coordinates.

These three angles are defined as follows for a quaternion $q_i$:

$$\omega_i = \arccos(a_i)$$

$$\theta_i = \arctan2(c_i, b_i)$$

$$\varphi_i = \arccos\left(\frac{d_i}{\sqrt{b_i^2 + c_i^2 + d_i^2}}\right)$$

where arccos is the arc cosine function (with a value between [0, π]) and arctan 2 is the tangent arc on the 4 quadrants in order to acquire an angle on [−π, π]. In variants, other definitions of the angles $\omega_i$, $\theta_i$ or $\varphi_i$ can be adopted (for example, from an arc sine function denoted arcsin); in this case, the quantization must take into account a different interval (for example: [−π/2, π/2] instead of [0, π]) and the formulae provided above for determining the 3 angles also must be adapted accordingly (like the inverse conversion).

The three angles $\omega_i$, $\theta_i$ and $\varphi_i$ as defined above have values on the interval [0, π], [−π, π] and [0, π], respectively.

In order to reduce the complexity as much as possible, the three angles are quantized in step E530, for example, by uniform scalar quantization, taking into account the index $F_i$ as defined above, provided in step E531, for a quaternion $q_i$.

FIG. 5*d* will now be referred to in order to describe the steps implemented in step E530 in order to quantize these 3 angles.

Considering, in step E540, the three angles $\omega_i$, $\theta_i$ and $\varphi_i$, and in step E531 the indication $F_i$, these angles are respectively quantized in steps E541, E542 and E543 in order to acquire three quantization indices $(idx_{i1}, idx_{i2}, idx_{i3})$ in steps E551, E552 and E553, for a quaternion $q_i$.

To this end, a parameter F ("Full range") defining the width of the quantization interval and T ("Two sided") defining the existence of positive and negative values in the interval are defined for each of the angles.

For the case of the angle $\omega_i$, the value of F corresponds to the value of $F_i$, i.e., the indication of the absence of a positive component. In the case of a first quaternion for which the value of a component has been forced positive, this value will be 0, i.e., the width of the quantization interval will be reduced to a half-interval.

Conversely, for a second quaternion, for which the value of $F_i$ is 1, the entire quantization interval is used (F=1).

For the case of the angle $\omega_i$, the value of T is set to 0, i.e., the quantization interval does not include negative values. Indeed, the quantization interval is [0, π/2] or [0, π] for this angle.

For the case of the angle $\theta_i$, the quantization interval is [−π, π]. The value of F is defined as 1 and that of T is defined as 1.

For the case of the angle $\varphi_i$, the quantization interval is [0, π]. The value of F is defined as 1 and that of T is defined as 0.

Figure 5E:
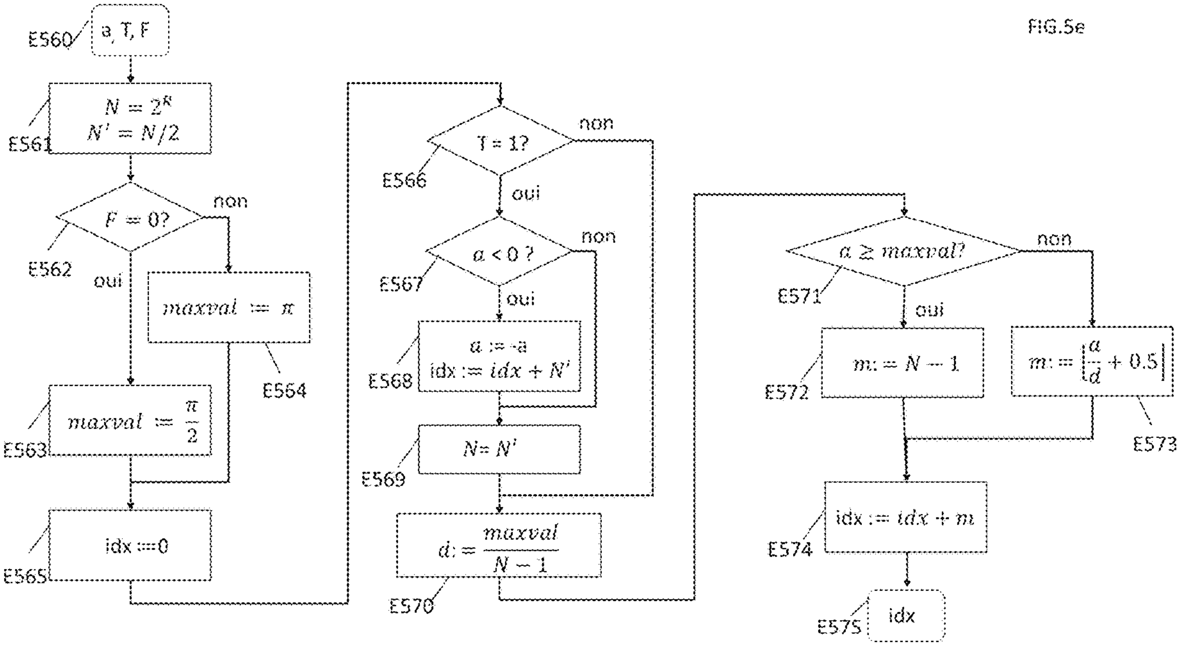
FIG. 5*e* uses a flowchart to illustrate the steps implemented when quantizing an angle according to a particular embodiment of the disclosure.

The step of quantizing an angle, generically denoted α, such as step E541, E542 or E543, will now be described in the flowchart of FIG. 5*e*.

Starting, in step E560, with the respective values of α (value of the $\omega_i$, $\theta_i$ and $\varphi_i$), T and F as defined above, the parameters N and N' are defined in step E561.

$N=2^R$ and N'=N/2, where R is the number of bits set, for example, to 8 bits.

In step E562, the value of F is checked. If F=0, the width of the quantization interval is reduced by half and therefore has the maximum value (maxval) of π/2 in step E563. Otherwise, if F=1, the quantization interval is not reduced and its maximum value (maxval) is π.

In step E565, the value of the quantization index idx is set to the value 0.

In step E566, the value of T is checked. If T is equal to 1, a check is carried out in step E567 to determine whether the value of α is negative. If so, the absolute value of the value of the angle α is taken in step E568 and an offset (N') is added to the quantization index.

The value of N is updated in step E569 (N=N') in order to indicate that half the quantization indices are reserved for the positive values.

In the case whereby α is positive in step E567, the method proceeds directly to step E569.

In step E570, a quantization pitch d is defined as being the maximum value (maxval) of the interval on N−1.

In the case whereby T is equal to 0 in step E566, the method proceeds directly to step E570.

In step E571, the value of α is checked by comparing it with the maximum value of the interval.

In the case whereby α is greater than this maximum value (maxval), step E572 defines as a quantized value m=N−1, otherwise, this quantized value is defined as $$m = \left\lfloor \frac{a}{d} + 0.5 \right\rfloor$$

In step E574, the value of the quantization index is updated with this quantized value m.

Thus, the quantization value idx of the angle encoded in step E575, which can be transmitted to a decoder, is acquired. In variants, other scalar quantization forms can be implemented (for example: other quantization steps, decision thresholds or reconstruction levels) and the binary allocation R can be different from 8 bits for each of the angles $\omega_i$, $\theta_i$ and $\varphi_i$ in order to have a specific bit budget for each of the angles.

It should be noted that, according to an aspect of the disclosure, the encoding of $q_1$ requires one bit less than the encoding of $q_2$, since the constraint $a_1 \geq 0$ is exploited by defining $\omega_1$ on [0, π/2] instead of [0, π]. Indeed, for the case of a uniform scalar quantization on R bits (for example, R=8 bits), with $N=2^R$ quantization values (or reconstruction levels), if the quantization pitch d is set to d=(π/2)/(N−1) to cover the half-length interval ranging from 0 to π/2 (inclusive) with N−1 sub-intervals, there will need to be N−2 additional sub-intervals of the same width d in order to cover the complete interval ranging from 0 to π, which requires 1 additional bit. In order to avoid leaving an unused value, it is also possible to slightly adapt the pitch to d'=π/(N−1), where $N=2^{R+1}$. For R=8 bits, the difference d−d' is negligible, it is (π/2)/255−π/511 of the order of 0.0007 degrees.

Thus, for encoding $q_1$, 8 bits are used for $\omega_1$, 9 bits for $\theta_1$ and 8 bits for $\varphi_1$, that is 25 bits. For encoding $q_2$, 9 bits are used for $\omega_2$, 9 bits for $\theta_2$, 8 bits for $\varphi_2$, that is 26 bits. In total, the budget used is therefore 51 bits.

The roles of $q_1$ and $q_2$ obviously can be interchanged in order to force a component to be positive and for the quantization.

The encoding method as described for FIG. 3 comprises an interpolation step carried out by the block 360 that is computed for the two acquired quaternions. In this case, a conversion does not need to be carried out between different domains, for example, between the domain of generalized Euler angles and that of quaternions, since the dual quaternions used for the quantization are already acquired after decoding.

In the embodiment described herein, the quaternions used in the interpolation step of the block 360 of FIG. 3 originate from local decoding of the quaternions quantized in the block 340. This local decoding is actually carried out so that the interpolation step is carried out in the same manner on the encoder side as on the decoder side in order to acquire a perfect reconstruction on the decoder (in the absence of encoding noise introduced by the blocks 380 and 480).

However, in a variant, the quaternions used for the interpolation step of the block 360 can originate directly from the conversion step of the block 330 without passing through the steps of quantization and of inverse quantization.

This interpolation can be carried out as described in the aforementioned patent application. Other embodiments of the interpolation are possible.

Once the interpolation is computed separately for the two quaternions $q_1$ and $q_2$, a 4×4 dimension rotation matrix is computed, for example, by explicitly computing the matrix product $M=Q_1Q_2^*=Q_2Q_1^*$ after having formed the matrices $Q_1$ and $Q_2^*$ (or $Q_2$ and $Q_1^*$) as previously defined.

In a variant, the 6 acquired angles, $\omega_1$, $\theta_1$, $\varphi_1$, $\omega_2$, $\theta_2$, $\varphi_2$ can be quantized by a vector quantization method with a "hyper-rectangular" support ([0,π/2]×[−π,π]×[0,π]×[0,π]×[−π,π]×[0,π]), taking into account the respective intervals as defined above, for example, according to the TCQ method described in the article by J. P. Adoul entitled, "Lattice and Trellis Coded Quantizations for efficient Coding of Speech", In: Ayuso, Soler (eds), Speech Recognition and Coding, NATO ASI Series, 1995.

In another embodiment, a scalar quantization can be implemented for the two angles $\omega_1$ and $\omega_2$ (corresponding to the real part of the quaternions) and a separate 3-dimensional spherical quantization can be carried out for the other angles, $\theta_1$, $\varphi_1$ and $\theta_2$, $\varphi_2$, corresponding to the imaginary parts of the quaternions. The quantization dictionary generally can be any discretization of the sphere by a finite number of points, but it is advantageous to use a quasi-uniform discretization (of the Lebedev, t-design type, etc.) for better performance, and, in variants, a discretization of the lat-long type (latitude-longitude) also can be used.

A lat-long approach is described below:

The components $(b_i,c_i,d_i)$ are seen as a 3D Cartesian vector, which can be implemented in the form of spherical coordinates $(r_i, \theta_i, \varphi_i)$. The radius $r_i$ is provided by $r_i=\sin(\omega_i)$. The angles $\theta_i$, $\varphi_i$ are determined as described in the present disclosure, they respectively correspond to the longitude and the latitude. These angles can be quantized according to the dictionary (with angles in degrees) as described in section 3.2 in the article by Perotin et al. entitled, "CRNN-based multiple DoA estimation using acoustic intensity features for Ambisonics recordings", IEEE Journal of Selected Topics in Signal Processing, 2019:

$$\hat{\varphi}_n = -90 + \frac{n}{I(\alpha)}180,\ n = 0, \ldots, I(\alpha)$$

$$\hat{\theta}_m^n = -180 + \frac{m}{J_n(\alpha)+1}360,\ m = 0, \ldots, J_n(\alpha)$$

$$\text{where } I(\alpha) = \left\lfloor \frac{180}{\alpha} \right\rfloor \text{ and } J_n(\alpha) = \left\lfloor \frac{360}{\alpha}\cos\hat{\varphi}_n \right\rfloor$$

However, it should be noted that the latitude is defined in the article by Perotin et al. with an arcsine function, therefore, it is worthwhile applying the conversion $90-\hat{\varphi}_n$ in order to encode the angle $\varphi_i$ defined herein, with no loss of generality, with an arccos function.

This involves a conditional quantization of 2 angles where the latitude $\theta_i$ is encoded first by finding the nearest neighbor from among $90-\hat{\varphi}_n$,n=0, . . . , 1(α) and then the longitude $\hat{\theta}_i$ is encoded by finding the nearest neighbor from among $\hat{\theta}_m^n$ as a function of the selected index n.

The number of necessary bits is $\lceil \log_2 N(\alpha) \rceil$, where $$N(\alpha) = \sum_{n=0}^{I(\alpha)} J_n(\alpha)$$

The size of the dictionary is, for example, $N(\alpha)=429$, 1687 or 4645 for $\alpha=10$, 5 or 3 degrees (respectively), that is 9, 11, or 13 bits (rounding up to the nearest whole number).

Other levels of reconstructions $90-\hat{\varphi}_n$ and/or $\hat{\theta}_m$ (and other decision thresholds) can be used for a dictionary with a given size $N(\alpha)$.

In variants of the disclosure, a unit quaternion $q_i=(a_i,b_i,c_i,d_i)$ is encoded in step E330 using the 4-dimensional spherical coordinates (while noting in this case that the radius is set to 1 because the quaternion $q_i$ is a unit quaternion):

$$a_i=\cos(\phi_{i0})$$

$$b_i=\sin(\phi_{i0})\cos(\phi_{i1})$$

$$c_i=\sin(\phi_{i0})\sin(\phi_{i1})\cos(\phi_{i2})$$

$$d_i=\sin(\phi_{i0})\sin(\phi_{i1})\sin(\phi_{i2})$$

where $\phi_{i0}$ is on $[0, \pi]$ or $[0, \pi/2]$ according to an aspect of the disclosure, $\phi_{i1}$ on $[0, \pi]$ and $\phi_{i2}$ on $[0, 2\pi]$.

The spherical coordinates can be determined by:

$$\phi_{i0} = \arccos(a_i)$$

$$\phi i_1 = \arccos\left(b_i/\sqrt{b_i^2 + c_i^2 + d_i^2}\right)$$

$$\phi i_2 = \begin{cases} \arccos\left(c_i/\sqrt{c_i^2 + d_i^2}\right) & d_i \geq 0 \\ 2\pi - \arccos\left(c_i/\sqrt{c^2 + d_i^2}\right) & d_i < 0 \end{cases}$$

The special cases where some components are zero (for example: $c_i=0$, $d_i=0$) are not processed in this case, but by convention the angle corresponding to zero values can be set to 0.

For this variant, all the embodiments described above for encoding 6 angles (separate or joint) apply.

In variants, other definitions of spherical coordinates can be used.

In a second embodiment, a 4-dimensional spherical vector quantization is implemented.

The fact that a component of the first quaternion has been forced to be positive allows the sign of said quaternion to be known and only the relevant positive quaternion to be encoded, with the negative quaternion corresponding to the same rotation. Thus, for the first quaternion, a hemispherical vector quantization is sufficient and allows the rate to be reduced compared to a spherical quantization.

Thus, $q_1$ can be quantized with a hemispherical dictionary (in which the first component of each code word is positive) and $q_2$ can be quantized with a spherical dictionary. The roles of $q_1$ and $q_2$ obviously can be interchanged in order to force a component to be positive and for the quantization.

Examples of dictionaries can be provided by predefined points in 4-dimensional regular or irregular polyhedrons. A simple example of a 4-dimensional spherical dictionary on 7 bits is provided by the 120 vertices of a "600-cell" that correspond to the combination of the following points:

8 signed permutations of (±1, 0, 0, 0);

16 signed permutations of (±½,±½,±½,±½);

96 even permutations $$\left(\pm\frac{\sqrt{5}+1}{4}, \pm\frac{\sqrt{5}-1}{4}, \pm 1/2, 0\right).$$

The hemispherical version of such a dictionary comprises the following 60 points (on 6 bits):

4 signed permutations of the "leader vector" (or leader) (±1,0,0,0) with the first positive component;

8 signed permutations of the leader (±½,±½,±½,±½) with the first positive component;

48 signed even permutations of the leader $$\left(\pm\frac{\sqrt{5}+1}{4}, \pm\frac{\sqrt{5}-1}{4}, \pm 1/2, 0\right)$$

with the first positive component.

Considering a spherical or hemispherical dictionary, the quantization firstly involves finding the nearest neighbor of the quaternion to be encoded; in general, this operation can be optimized by exploiting the underlying algebraic structure and by comparing only "absolute vectors" by scalar product. The quantization also includes an explicit step of indexing (computation of the quantization index identifying the nearest code word), and in general the index is computed by a permutation index (signed) and an offset depending on the absolute vector representing the nearest neighbor. These concepts are considered to be already known to a person skilled in the art.

This embodiment by vector quantization has the disadvantage of having to explicitly determine the quantization index and also of having to store certain elements describing the quantization dictionary. In order to be able to encode a quaternion with a budget of approximately 25 bits, the 4-dimensional dictionary must combine a very large number of combinations of representative points (leaders).

Also, in other variants, a conditional scalar quantization can be applied.

The following definition of the 4-dimensional spherical coordinates is used in this case:

$$a_i=\cos(\phi_{i0})$$

$$b_i=\sin(\phi_{i0})\cos(\phi_{i1})$$

$$c_i=\sin(\phi_{i0})\sin(\phi_{i1})\cos(\phi_{i2})$$

$$d_i=\sin(\phi_{i0})\sin(\phi_{i1})\sin(\phi_{i2})$$

where $\phi_{i0}$ is on $[0, \pi]$ or $[0, \pi/2]$ according to an aspect of the disclosure, $\phi_{i1}$ on $[0, \pi]$ and $\phi_{i2}$ on $[0, 2\pi]$.

The principle of the 3-dimensional spherical quantization is generalized in 4-dimensions by a dictionary of the lat-long type. To this end, the angle $\pi_{i0}$ is converted into degrees and quantized with a scalar dictionary with a uniform pitch that depends on the interval:

on an interval [0, 180]:

$$\hat{\phi}_{i0} = \frac{n}{I(\alpha)}180, n = 0, \ldots , I(\alpha)$$

$$\text{where } I(\alpha) = \left\lfloor\frac{180}{\alpha}\right\rfloor.$$

on an interval [0, 90]:

$$\hat{\phi}_{i0} = \frac{n}{I(\alpha)}90, n = 0, \ldots , I(\alpha)$$

-continued where $I(\alpha) = \left\lfloor \frac{90}{\alpha} \right\rfloor$.

The parameter α indicates the angular resolution (for example, α=5 degrees).

Then, the angle $\pi_{i1}$ is converted into degrees and quantized with a scalar dictionary on the interval [0, π] for which the number of sub-intervals (and of levels of reconstructions $\hat{\pi}_{i1}$)) depends on the value of $\hat{\pi}_{i0}$. Finally, the angle $\pi_{i2}$is converted into degrees and quantized with a scalar dictionary on the interval [0, πn] for which the number of sub-intervals (and of levels of reconstruction $\hat{\pi}_{i2}$) depends on the value of the dictionaries of $\hat{\pi}_{i0}$ and $\hat{\pi}_{i1}$. Separate quantization dictionaries defining $\hat{\pi}_{i1}$ and $\hat{\pi}_{i2}$ can be defined, in one example, from a 3-dimensional spherical quantization dictionary of the lat-long type so that the size N (α') thereof is adapted as a function of the value of $\hat{\pi}_{i0}$. The particular benefit of this variant is to have an element of the vector quantization dictionary that corresponds to $q_1=q_2=(1,0,0,0)$ and also to be able to more evenly distribute the elements of the 4-dimensional quantization dictionary compared to an independent scalar quantization for each of the angles $\pi_{i)}$, $\pi_{i1}$, $\pi_{i2}$.

In another variant of variable rate encoding, a step of selecting the type of encoding and of deciding to multiplex the indices is added. A bit is defined that can indicate that the dual quaternion is encoded by $q_1=q_2=(1,0,0,0)$ (defined as default values), which at the same time indicates that the transformation matrix is an identity matrix. In this case, the bit budget for encoding a dual quaternion according to the main embodiment varies between two possible values: 1 bit if the dual quaternion is encoded by the values $q_1=q_2=(1,0,0,0)$ and 52 bits (1+51) otherwise; in this latter case, an aspect of the disclosure described previously and in variants is applied, the quantization dictionary that is used may not contain the case $q_1=q_2=(1,0,0,0)$ since this case is covered when a single bit is encoded.

In addition, the multiplexing block (390) adds an additional bit in order to indicate the encoding mode that is used.

An embodiment will now be described that is specific to the case of a 3×3 rotation matrix. The disclosure described above also applies with, in this case, $q_1=q$ and $q_2=-q$. Therefore, only one quaternion (for example, $q_1$) is encoded and advantageously the indication of the absence of a positive component $F_1=0$ is used in order to save one bit. With the budget described in the embodiment, encoding on 25 bits is therefore acquired. All the possible variants of encoding are found in the 3×3 case (spherical vector quantization with a hemispherical dictionary, conversion into spherical coordinates and quantization of the angles, etc.).

In a variant of this embodiment, a step of selecting the type of encoding and of deciding to multiplex the indices also can be added. An overall bit is defined that can indicate that the quaternion is encoded by q=(1,0,0,0). In this case, the bit budget for encoding a quaternion according to this variant varies between two possible values: 1 bit if the quaternion is encoded by q=(1,0,0,0) and 26 bits (1+25) otherwise.

In all the variants described above for the encoding, entropic encoding (for example, of the Huffman or arithmetic type) also can be optionally used after the quantization, which in general can reduce the average rate at the expense of a variable rate.

Figure 6A:
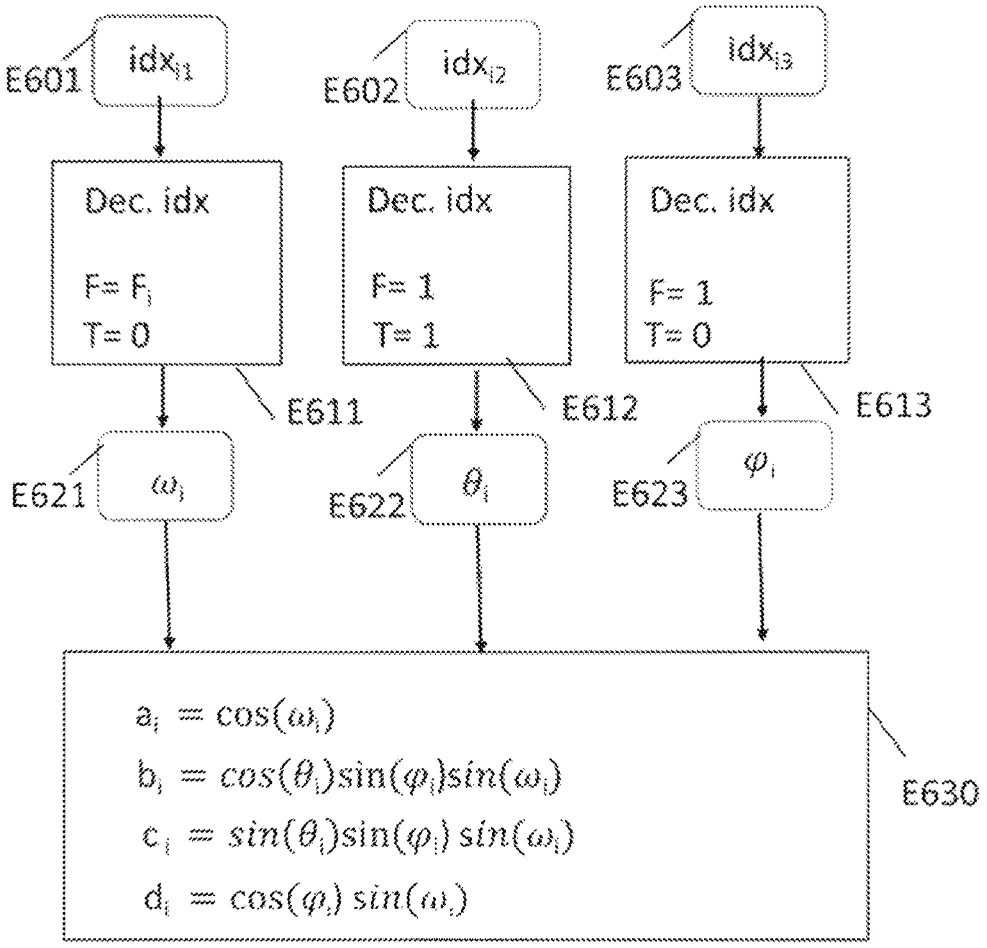
FIG. 6*a* uses a flowchart to illustrate the steps implemented during the inverse quantization of a dual quaternion when decoding a multichannel audio signal, according to one embodiment of the disclosure.

The decoding method will now be described, and in particular the inverse quantization step carried out by the block 400 of FIG. 4. FIG. 6*a* describes one embodiment.

The quantization indices idx1, idx2 and idx3 for each of the quaternions i are received by the decoder in steps E601, E602 and E603 and are decoded in steps E611, E612, E613, respectively.

The quantization interval width parameters F and the existence of positive and negative values of the interval T are also acquired in steps E611, E612 and E613. The indication of the absence of a positive component $F_1$ is also acquired in step E611.

Thus, in step E611, $F_i$ is acquired as a value of F and 0 as a value of T.

In step E612, 1 is acquired as a value of F and 1 is acquired as a value of T and, in step E613, 1 is acquired as a value of F and 0 is acquired as a value of T.

The inverse quantization steps carried out in steps E611, E612 and E613 allow the angles $\omega_i$, to be decoded in step E621, $\theta_i$ in step E622 and $\varphi_i$ in step E623.

The components of the respective quaternions $a_i,b_i,c_i,d_i$ are then decoded in step E630 from the angles thus decoded, according to the following formulae:

$$a_i=\cos(\omega_i)$$

$$b_i=\cos(\theta_i)\sin(\phi_i)\sin(\omega_i)$$

$$c_i=\sin(\theta_i)\sin(\phi_i)\sin(\omega_i)$$

$$d_i=\cos(\phi_i)\sin(\omega_i)$$

Figure 6B:
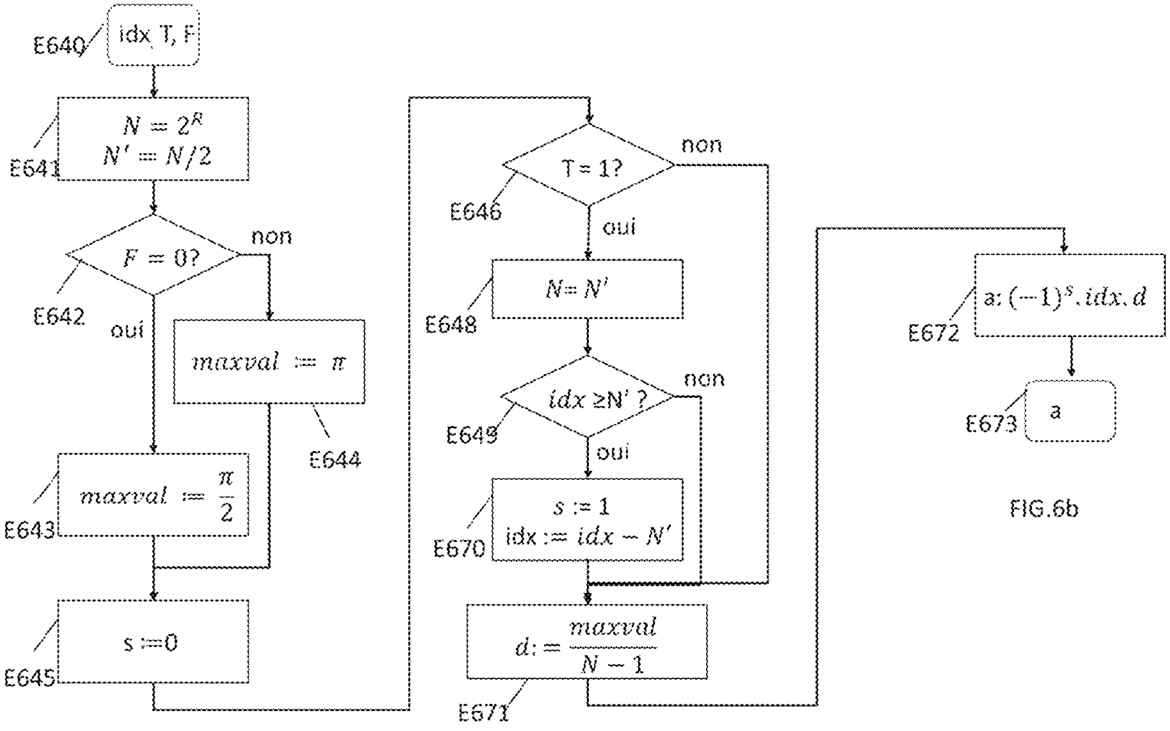
FIG. 6*b* uses a flowchart to illustrate the steps implemented during the inverse quantization of an angle defining a quaternion, according to one embodiment of the disclosure.

The step of inverse quantization of an angle, such as step E611, E612 or E613 will now be described in the flowchart of FIG. 6*b*.

In step E640, starting with the respective values of idx (quantization index of an angle), T and F as defined above, the parameters N and N' are defined in step E641. $N=2^R$ and N'=N/2, with R being a bit value set to 8 bits in this embodiment. In step E642, the value of F is checked. If F=0, the width of the quantization interval is reduced by half and therefore has π/2 as the maximum value in step E643. Otherwise, if F=1, the quantization interval is not reduced and its maximum value in step E644 is π.

In step E645, the value of a sign parameter s is set to the value 0.

In step E646, the value of T is checked. If T is equal to 1, the value of N is updated in step E648 (N=N').

In step E649, the value of idx is checked. If said value is not greater than or equal to N', then, in step E670, the value of s is set to 1 and that of idx is updated by subtracting it from N'. Indeed, the indices from 0 to N'−1 correspond to the positive values and the indices from N' to N−1 correspond to the negative values.

In step E671, a quantization pitch d is defined as being the maximum value of the interval on N−1.

In the case where T is equal to 0 in step E646, the method proceeds directly to step E671.

In the case where idx is greater than or equal to N' in step E649, the method proceeds directly to step E671.

In step E672, the value of a is computed as being the following value: (−1)s.idx.d.

The value of α, i.e., the value of the angle in step E673, is thus decoded.

Figure 7:
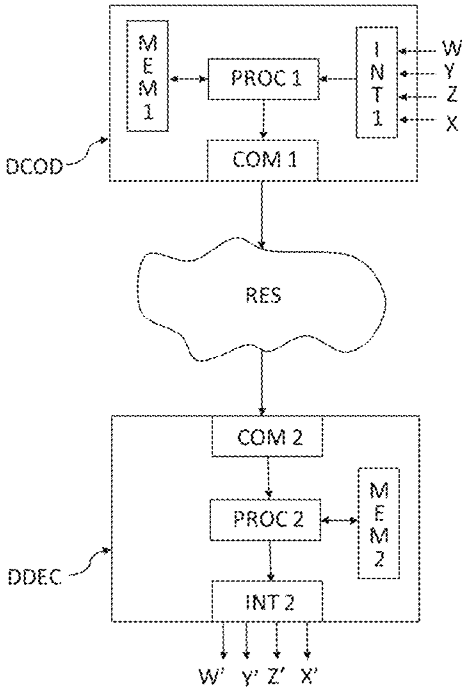
FIG. 7 illustrates structural embodiments of an encoder and of a decoder according to one embodiment of the disclosure.

FIG. 7 shows an encoding device DCOD and a decoding device DDEC, within the meaning of an aspect of the disclosure, with these devices being dual with respect to each other (in the reversible direction) and connected to each other by a communication network RES.

In other embodiments, the step of inverse quantization of the decoding method, carried out by the block 400 of FIG. 4, is adapted to the quantization method carried out for the encoding.

Thus, inverse spherical vector quantization can be carried out. An indication of the existence of a positive component received for the decoding makes it possible to know whether a hemispherical quantization has been carried out for the encoding in order to encode a first quaternion. In this case, the inverse quantization will be an inverse hemispherical vector quantization for decoding this first quaternion.

Similarly, in the case whereby a conditional scalar quantization using spherical coordinates is used on the encoder, the decoder will carry out an inverse quantization in order to retrieve these spherical coordinates and decode the corresponding quaternions.

The encoding device DCOD comprises a processing circuit typically including:

- a memory MEM1 for storing instruction data of a computer program within the meaning of an aspect of the disclosure (with these instructions being able to be distributed between the encoder DCOD and the decoder DDEC);
- an interface INT1 for receiving an original multichannel signal B, for example, an ambisonic signal distributed over various channels (for example, four, first-order channels W, Y, Z, X) with a view to the compression encoding thereof within the meaning of an aspect of the disclosure;
- a processor PROC1 for receiving this signal and processing it by executing the computer program instructions stored by the memory MEM1, with a view to the encoding thereof; and
- a communication interface COM1 for transmitting the encoded signals via the network.

The decoding device DDEC comprises a clean processing circuit, typically including:

- a memory MEM2 for storing instruction data of a computer program within the meaning of an aspect of the disclosure (with these instructions being able to be distributed between the encoder DCOD and the decoder DDEC as stated above);
- an interface COM2 for receiving the encoded signals from the network RES with a view to the compression decoding thereof within the meaning of an aspect of the disclosure;
- a processor PROC2 for processing these signals by executing the computer program instructions stored by the memory MEM2, with a view to the decoding thereof; and
- an output interface INT2 for delivering the decoded signals, for example, in the form of ambisonic channels W . . . X, with a view to the rendering thereof.

Of course, this FIG. 7 illustrates a structural embodiment of a codec (encoder or decoder) within the meaning of an aspect of the disclosure. FIGS. 3 to 6, as discussed above, provide a detailed description of mostly functional implementations of these codecs.

Although the present disclosure has been described with reference to one or more examples, workers skilled in the art will recognize that changes may be made in form and detail without departing from the scope of the disclosure and/or the appended claims.

The invention claimed is:

1. A method for encoding a multichannel audio signal with an encoding device, the method comprising:
- forming a transformation matrix in the form of a rotation matrix,
- applying the rotation matrixto the multichannel audio signal to produce a transformed signal,
- quantizing the rotation matrix,
- encoding the transformed signal,
- wherein quantizing the rotation matrix comprises operations including:
  - converting the rotation matrix in the quaternion domain with at least one first quaternion;
  - forcing said first quaternion to have a positive component;
  - converting the at least one first quaternion into spherical coordinates, with one of the spherical coordinates being associated with the positive forced component of the first quaternion; and
  - quantizing the acquired spherical coordinates, with the spherical coordinate associated with the positive forced component of the first quaternion being quantized over a half-length interval.

2. The method as claimed in claim 1, wherein the positive component of said first quaternion is its real component.

3. The method as claimed in claim 1, wherein the rotation matrix is converted into a dual quaternion, comprising a first quaternion for which a component is forced to be positive and a second quaternion.

4. The method as claimed in claim 3, wherein the quantization of the first quaternion uses one bit less than the quantization of the second quaternion.

5. The method as claimed in claim 3, wherein converting each of the first and second quaternions of the dual quaternion into spherical coordinates yields three angles, and quantization of the angle associated with the positive component of the first quaternion is carried out at a half-length interval relative to an interval used to quantize the same component in the second quaternion.

6. The method as claimed in claim 5, comprising carrying out quantization of six acquired angles by uniform scalar quantization.

7. The method as claimed in claim 5, comprising carrying out quantization of six acquired angles by vector quantization with a hyper-rectangular support.

8. The method as claimed in claim 1, comprising encoding a binary indication in order to indicate whether the at least one first quaternion assumes default values.

9. A method for decoding a multichannel audio signal with a decoding device, the method comprising:
- receiving encoded signals from a multichannel signal;
- receiving parameters of quantized spherical coordinates of a set of at least one first quaternion and an indication of existence of a positive component;
- decoding the at least one first quaternion from the received parameters by taking a half-length quantization interval in order to decode a spherical coordinate associated with the indicated positive component;
- constructing an inverse rotation matrix from the at least one first decoded quaternion; and
- applying said inverse rotation matrix to the received encoded signals, before decoding said encoded signals.

10. An encoding device comprising:
- a processing circuit configured to encode a multichannel audio signal by:
- forming a transformation matrix in the form of a rotation matrix, applying the rotation matrix to the multichannel audio signal to produce a transformed signal, quantizing the rotation matrix, encoding the transformed signal, wherein quantizing the rotation matrix comprises operations including:

converting the rotation matrix in the quaternion domain with at least one first quaternion;

forcing said first quaternion to have a positive component;

converting the at least one first quaternion into spherical coordinates, with one of the spherical coordinates being associated with the positive forced component of the first quaternion; and quantizing the acquired spherical coordinates, with the spherical coordinate associated with the positive forced component of the first quaternion being quantized over a half-length interval.

11. A decoding device comprising:

a processing circuit configured to decode a multichannel audio signal by:

receiving encoded signals from a multichannel signal;

receiving parameters of quantized spherical coordinates of a set of at least one first quaternion and an indication of existence of a positive component;

decoding the at least one first quaternion from the received parameters by taking a half-length quantization interval in order to decode a spherical coordinate associated with the indicated positive component;

constructing an inverse rotation matrix from the at least one first decoded quaternion; and applying said inverse rotation matrix to the received encoded signals, before decoding said encoded signals.

12. A non-transitory processor-readable storage medium storing a computer program comprising instructions for executing a method for encoding a multichannel audio signal when the instructions are executed by a processor of an encoding device, the method comprising:

forming a transformation matrix in the form of a rotation matrix, applying the rotation matrix to the multichannel audio signal to produce a transformed signal, quantizing the rotation matrix, encoding the transformed signal, wherein quantizing the rotation matrix comprises operations including:

converting the rotation matrix in the quaternion domain with at least one first quaternion;

forcing said first quaternion to have a positive component;

converting the at least one first quaternion into spherical coordinates, with one of the spherical coordinates being associated with the positive forced component of the first quaternion; and quantizing the acquired spherical coordinates, with the spherical coordinate associated with the positive forced component of the first quaternion being quantized over a half-length interval.

13. A non-transitory processor-readable storage medium storing a computer program comprising instructions for executing a method of decoding a multichannel audio signal when the instructions are executed by a processor of a decoding device, the method comprising:

receiving encoded signals from a multichannel signal;

receiving parameters of quantized spherical coordinates of a set of at least one first quaternion and an indication of existence of a positive component;

decoding the at least one first quaternion from the received parameters by taking a half-length quantization interval in order to decode a spherical coordinate associated with the indicated positive component;

constructing an inverse rotation matrix from the at least one first decoded quaternion; and applying said inverse rotation matrix to the received encoded signals, before decoding said encoded signals.

* * * * *